(12) United States Patent
Dearing

(10) Patent No.: US 12,085,106 B2
(45) Date of Patent: Sep. 10, 2024

(54) UNIVERSAL HARDWARE NUT

(71) Applicant: Nut Solutions, LLC, Houston, TX (US)

(72) Inventor: William Noah Dearing, Houston, TX (US)

(73) Assignee: Nut Solutions, LLC, Houston, TX (US)

( * ) Notice: Subject to any disclaimer, the term of this patent is extended or adjusted under 35 U.S.C. 154(b) by 282 days.

(21) Appl. No.: 17/677,836

(22) Filed: Feb. 22, 2022

(65) Prior Publication Data

US 2022/0268306 A1   Aug. 25, 2022

Related U.S. Application Data

(60) Provisional application No. 63/151,549, filed on Feb. 19, 2021.

(51) Int. Cl.
*F16B 23/00* (2006.01)

(52) U.S. Cl.
CPC ...... *F16B 23/0023* (2013.01); *F16B 23/0092* (2013.01); *F16B 23/00* (2013.01)

(58) Field of Classification Search
CPC ...... F16B 21/18; F16B 23/00; F16B 23/0023; F16B 23/0092; F16B 37/00; F16B 39/24; F16B 43/00; Y10S 411/918
USPC ........ 411/432, 516–517, 531, 533, 904–908, 411/918
See application file for complete search history.

(56) References Cited

U.S. PATENT DOCUMENTS

| | | | | |
|---|---|---|---|---|
| 746,006 A * | 12/1903 | Brigham | ................ | F16B 43/00 411/533 |
| 970,423 A * | 9/1910 | Cunningham | .......... | F16B 43/00 411/533 |
| 1,421,638 A * | 7/1922 | Wheeler | ................ | F16B 37/02 411/437 |
| 1,697,602 A * | 1/1929 | Kulka | .................... | F16B 39/14 411/222 |
| 1,867,041 A * | 7/1932 | Walters | ................ | A47C 31/026 81/19 |
| 2,013,446 A * | 9/1935 | Reiter | .................... | F16B 21/06 24/350 |
| 2,197,220 A * | 4/1940 | Kost | ........................ | F16B 37/02 411/918 |
| 2,783,674 A * | 3/1957 | Becker | .................... | F16B 21/20 411/521 |
| 3,190,334 A * | 6/1965 | Wigam | .................. | F16B 43/00 411/959 |
| 3,796,124 A * | 3/1974 | Crosa | ........................ | F16B 5/00 52/489.1 |
| 4,935,028 A * | 6/1990 | Drews | ................ | A61B 17/0643 24/711.4 |

(Continued)

*Primary Examiner* — Roberta S Delisle
(74) *Attorney, Agent, or Firm* — Tumey L.L.P.

(57) ABSTRACT

A universal hardware nut that may be adaptable for use with various mating fasteners (e.g., bolts and screws). In one embodiment, the universal hardware nut comprises a nut body, wherein the nut body is manufactured from a pliable material; and one or more slots, wherein the one or more slots allow the nut body to accept fasteners of different sizes and shapes. In alternate embodiments, the universal hardware nut may comprise a sized hole instead of the one or more slots, or may comprise a combination of a sized hole and one or more slots.

19 Claims, 2 Drawing Sheets

(56) References Cited

U.S. PATENT DOCUMENTS

| | | | | | |
|---|---|---|---|---|---|
| 5,839,868 | A | * | 11/1998 | Kloian | F16B 21/20 411/905 |
| 6,368,319 | B1 | * | 4/2002 | Schaefer | A61B 17/8635 606/305 |
| 6,832,882 | B2 | * | 12/2004 | Janisch, Jr. | F16B 33/00 411/366.3 |
| RE39,499 | E | * | 2/2007 | Racz | A61M 39/0613 604/905 |
| 7,749,590 | B2 | * | 7/2010 | Shiga | C09J 7/22 411/531 |
| 8,118,526 | B2 | * | 2/2012 | Dowling | A47K 13/26 411/533 |
| 2003/0147723 | A1 | * | 8/2003 | Schwab | F16B 21/20 267/159 |

* cited by examiner

UNIVERSAL HARDWARE NUT

CROSS-REFERENCE TO RELATED APPLICATIONS

This application claims priority to U.S. Provisional Patent Application Ser. No. 63/151,549 filed Feb. 19, 2021, the entire contents of which are incorporated herein by reference thereto.

STATEMENT REGARDING FEDERALLY SPONSORED RESEARCH OR DEVELOPMENT

Not applicable.

BACKGROUND OF THE INVENTION

Field of the Invention

The present invention relates to a hardware nut. More particularly, the present invention relates to a universal hardware nut that may be adaptable for use with various mating fasteners (e.g., bolts and screws).

Background of the Invention

A nut may be a fastening assembly component used in conjunction with a mating fastener to permanently or semi-permanently join together parts or materials. Typically, nuts and their mating fasteners come in a range of shapes and sizes that may be selected based on their application. The size may be differentiated by three measurements: diameter, length, and thread pitch. Currently, in order to use a nut and a mating fastener together, the components must be designed with matching diameters and thread pitches. As such, each mating fastener may have a particular corresponding nut in order to work effectively and function properly.

This design can be problematic, particularly in situations in which the nut of a fastening assembly fails, becomes lost, or becomes damaged. When this occurs, an operator needing a replacement nut may desire to find and purchase a specific nut that corresponds to the mating fastener of a particular fastening assembly. This may lead to an increase in the time, effort, and expense to acquire the specific nut, and further, an increase in the time in which the fastening assembly may be rendered inoperable.

Consequently, there is a need for a universal hardware nut that may be adaptable for use with various mating fasteners, thus eliminating the need for a specific nut that corresponds to the mating fastener of a particular fastening assembly.

BRIEF SUMMARY OF SOME OF THE PREFERRED EMBODIMENTS

These and other needs in the art are addressed in one embodiment by a universal hardware nut comprising: a nut body, wherein the nut body is manufactured from a pliable material; and one or more slots, wherein the one or more slots allow the nut body to accept fasteners of different sizes and shapes.

These and other needs in the art are addressed in one embodiment by a universal hardware nut comprising: a nut body, wherein the nut body is manufactured from a pliable material; and a sized hole, wherein the sized hole allows the nut body to accept fasteners of different sizes and shapes.

These and other needs in the art are addressed in one embodiment by a universal hardware nut comprising: a nut body, wherein the nut body is manufactured from a pliable material; a sized hole; and one or more slots extending from the sized hole, wherein the sized hole in combination with the one or more slots allow the nut body to accept fasteners of different sizes and shapes.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
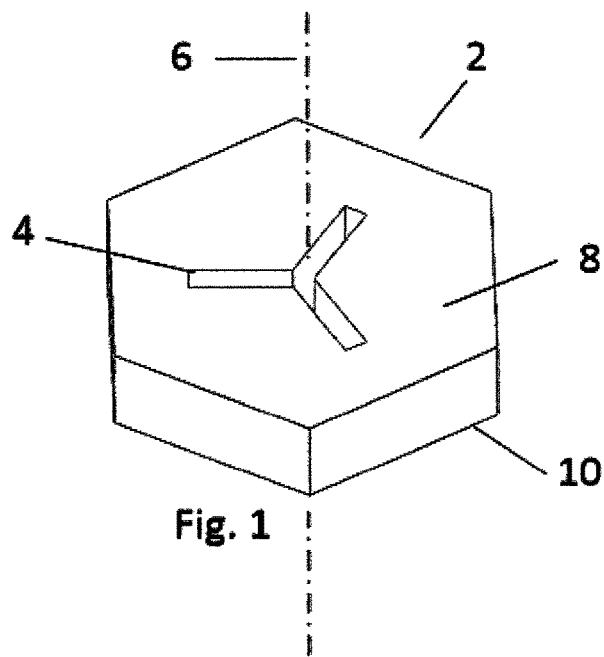
FIG. 1 illustrates a universal hardware nut comprising three slots in accordance with one embodiment of the present invention.

FIG. 1 illustrates a universal hardware nut comprising a nut body 2 extending along a central axis 6 from a first face 8 to a second face 10. Nut body 2 may be manufactured from any suitable material such as, without limitation, pliable material. In embodiments, nut body 2 may be manufactured from rubber, fiber-reinforced rubber, synthetic rubber, silicone, flexible or soft plastics, wood, leather, composite materials, or any combinations thereof. Additionally, nut body 2 may be any suitable size and shape depending on its intended application. For instance, the thickness of nut body 2 may be directly correlated to the amount of security or strength needed by or desired for a fastening assembly for a particular application, which may be predetermined (i.e., the thicker the nut body, the stronger and more secure it may be). Further, first and second faces 8 and 10 of nut body 2 may be, without limitation, circular, elliptical, rectangular, triangular, or polygonal in shape. As further illustrated in FIG. 1, nut body 2 may be penetrated by one or more slots 4 that may extend from first face 8 to second face 10 and be parallel to central axis 6. The one or more slots 4 may have any suitable configuration to allow nut body 2 to accept any suitable fastener. In embodiments, as illustrated in FIG. 1, the one or more slots 4 may comprise three slots 4, which may allow nut body 2 to accept fasteners of different sizes and shapes.

Figure 2A:
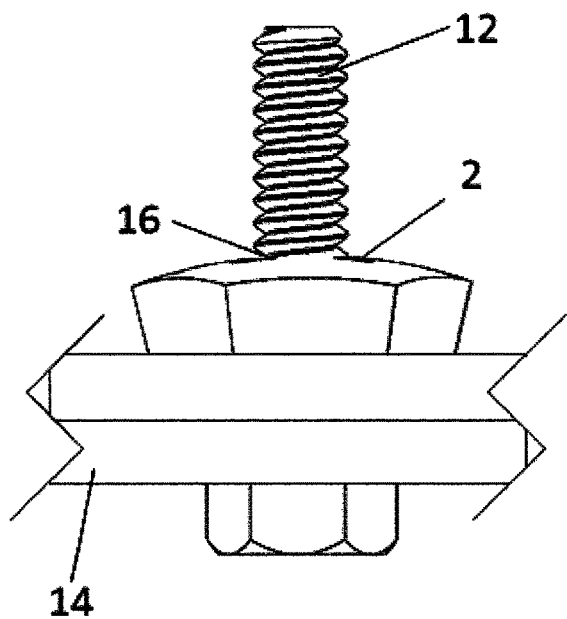
FIG. 2A illustrates a side view of a fastening assembly utilizing a universal hardware nut comprising three slots in accordance with one embodiment of the present invention.
Figure 2B:
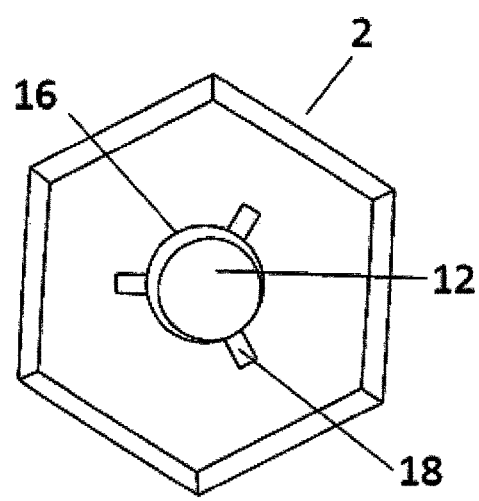
FIG. 2B illustrates a top view of a fastening assembly utilizing a universal hardware nut comprising three slots in accordance with one embodiment of the present invention.

FIGS. 2A and 2B illustrate a side view and a top view of a fastening assembly utilizing a universal hardware nut comprising one or more slots 4. The fastening assembly may comprise a fastener 12 and nut body 2, which may join together parts or materials 14. In embodiments, fastener 12 may pass through parts or materials 14 and be mated with nut body 2 by further passing through the one or more slots 4. Fastener 12 may be, without limitation, a bolt, screw, rivet, or retainer clip. In embodiments, due to its pliable nature and the configuration of the one or more slots 4, nut body 2 may be capable of accepting fastener 12 regardless of its type, diameter size, or thread pitch. Further, during the installation of fastener 12, nut body 2 may be elastically deformed to correspond to the diameter and thread pitch (if present) of fastener 12. As illustrated in FIGS. 2A and 2B, nut body 2 may axially deform about fastener 12 at contact points 16. While nut body 2 may not have continuous radial contact about fastener 12, leaving contactless points 18, increased axial contact points 16 may allow the fastening assembly to permanently or semi-permanently join together parts or materials 14.

Figure 3A:
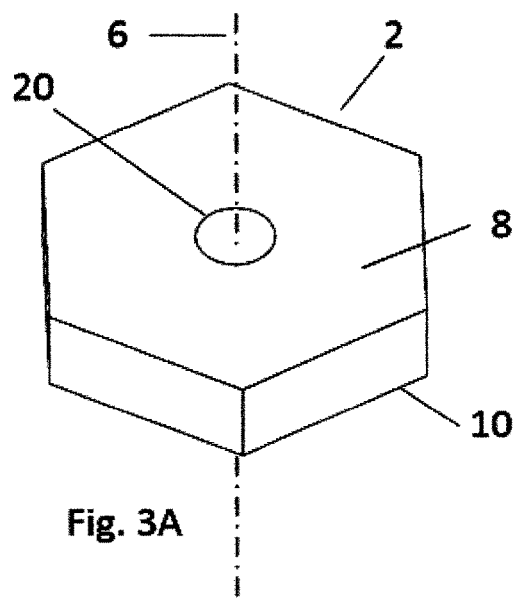
FIG. 3A illustrates a universal hardware nut comprising a sized hole in accordance with one embodiment of the present invention.
Figure 3B:
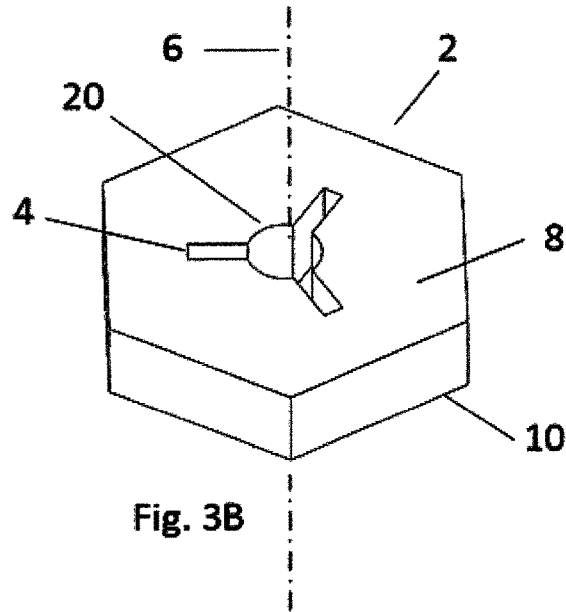
FIG. 3B illustrates a universal hardware nut comprising a sized hole and three slots in accordance with one embodiment of the present invention.

In alternative embodiments, as illustrated in FIGS. 3A and 3B, nut body 2 may be penetrated by a sized hole 20 as opposed to the one or more slots 4 or in addition to the one or more slots 4. Sized hole 20 may extend from first face 8 to second face 10 along central axis 6 and may be manufactured with any suitable dimensions. In embodiments, the dimensions of sized hole 20 may correspond to the dimensions, particularly the diameter sizes, of standardized fasteners in the art.

Figure 4A:
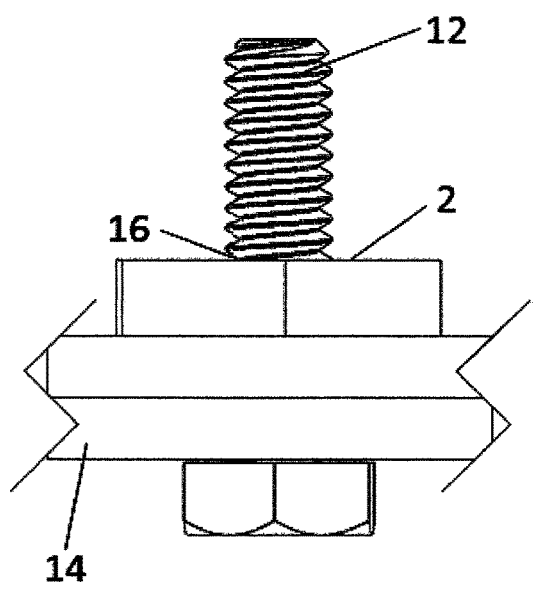
FIG. 4A illustrates a side view of a fastening assembly utilizing a universal hardware nut comprising a sized hole in accordance with one embodiment of the present invention.
Figure 4B:
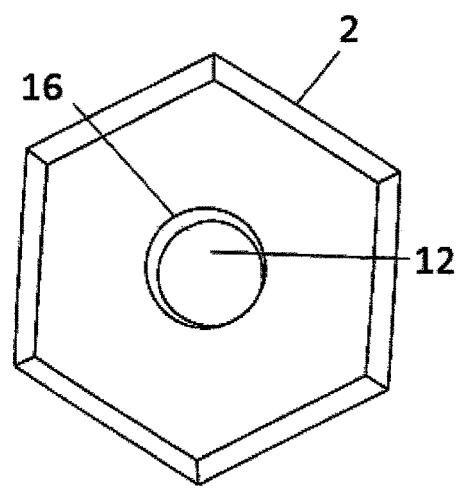
FIG. 4B illustrates a top view of a fastening assembly utilizing a universal hardware nut comprising a sized hole in accordance with one embodiment of the present invention.

FIGS. 4A and 4B illustrate a side view and a top view of a fastening assembly utilizing a universal hardware nut comprising sized hole 20. Similar to FIGS. 2A and 2B, the fastening assembly may comprise fastener 12 and nut body 2, which may join together parts or materials 14. In embodiments, fastener 12 may pass through parts or materials 14 and be mated with nut body 2 by further passing through sized hole 20. In embodiments, due to its pliable nature and the configuration of sized hole 20, nut body 2 may be capable of accepting fastener 12 regardless of its type, diameter size, or thread pitch. However, the range of suitable diameter sizes for fastener 12 may be more limited. For example, nut body 2 comprising sized hole 20 with a diameter of about 3 mm may be capable of accepting a fastener with a diameter from about 3 mm to about 5 mm. While the range of suitable fastener diameter sizes may be more limited, such embodiments of nut body 2 may provide increased security or strength for a particular fastener assembly. For instance, during the installation of fastener 12, nut body 2 may be elastically deformed to correspond to the diameter and thread pitch (if present) of fastener 12. As illustrated in FIGS. 4A and 4B, nut body 2 may radially deform about fastener 12 at contact points 16. As opposed to nut body 2 comprising one or more slots 4, nut body 2 comprising sized hole 20 may have continuous radial contact about fastener 12 that allows the fastening assembly to permanently or semi-permanently join together parts or materials 14.

Although the present invention and its advantages have been described in detail, it should be understood that various changes, substitutions and alterations may be made herein without departing from the spirit and scope of the invention as defined by the appended claims. For instance, the fastener assemblies described may additionally utilize other fastener components such as, without limitation, washers, retaining rings, anchors, or any combinations thereof.

What is claimed is:

1. A fastening assembly comprising:
   a universal hardware nut comprising:
      a nut body, wherein the nut body is manufactured from a pliable material; and
      nonintersecting one or more slots located on a first face of the nut body and penetrating through the nut body to a second face of the nut body, wherein the one or more slots allow the nut body to accept fasteners of different types, diameters, or thread pitches;
   a fastener, wherein the fastener comprises a head and body; and
   materials;
   wherein the body of the fastener extends through the materials and the universal hardware nut, and further wherein the head of the fastener abuts a first side of the materials, and further wherein the universal hardware nut abuts a second side of the materials.

2. The universal hardware nut of claim 1, wherein the nut body elastically deforms to correspond to a type, diameter, or thread pitch of the fastener.

3. The universal hardware nut of claim 1, wherein the nut body is manufactured from rubber, fiber-reinforced rubber, synthetic rubber, silicone, flexible or soft plastics, wood, leather, composite materials, or combinations thereof.

4. The universal hardware nut of claim 1, wherein the nut body comprises a thickness which correlates to a predetermined strength of thea fastener assembly which comprises the nut body.

5. The universal hardware nut of claim 1, wherein the first face and second face of the nut body are circular, elliptical, rectangular, triangular, or polygonal in shape.

6. The universal hardware nut of claim 1, wherein the one or more slots comprise two slots oriented in a perpendicular cross configuration.

7. A fastening assembly comprising:
   a universal hardware nut comprising:
      a nut body, wherein the nut body is manufactured from a pliable material; and
      a sized hole located on a first face of the nut body and penetrating through the nut body to a second face of the nut body, wherein the sized hole allows the nut body to accept fasteners with a diameter between 3 mm and 5 mm of different types;
      or thread pitches;
   a bolt, wherein the bolt comprises a head, a body, and threads, and further wherein the bolt comprises a diameter between 3 mm and 5 mm; and
   materials;
   wherein the body of the bolt extends through the materials and the universal hardware nut, and further wherein the head of the bolt abuts a first side of the materials, and further wherein the universal hardware nut abuts a second side of the materials.

8. The universal hardware nut of claim 7, wherein the nut body elastically deforms to correspond to the type, diameter, and thread pitch of the bolt.

9. The universal hardware nut of claim 7, wherein the nut body is manufactured from rubber, fiber-reinforced rubber, synthetic rubber, silicone, flexible or soft plastics, wood, leather, composite materials, or combinations thereof.

10. The universal hardware nut of claim 7, wherein the nut body comprises a thickness which correlates to a predetermined strength of a fastener assembly which comprises the nut body.

11. The universal hardware nut of claim 7, wherein the first face and second face of the nut body are circular, elliptical, rectangular, triangular, or polygonal in shape.

12. The universal hardware nut of claim 7, wherein a diameter of the sized hole corresponds to the diameter of the bolt.

13. A fastening assembly comprising:
   a universal hardware nut comprising:
      a nut body, wherein the nut body is manufactured from a pliable material;
      a sized hole located on a first face of the nut body and penetrating through the nut body to a second face of the nut body; and
      one or more slots extending from the sized hole, wherein the sized hole in combination with the one or more slots allows the nut body to accept fasteners of different types, diameters, or thread pitches;
   a bolt, wherein the bolt comprises a head, a body, and threads; and
   materials;
   wherein the body of the bolt extends through the materials and the universal hardware nut, and further wherein the head of the bolt abuts a first side of the materials, and further wherein the universal hardware nut abuts a second side of the materials.

14. The universal hardware nut of claim 13, wherein the nut body elastically deforms to correspond to a type, diameter, or thread pitch of a fastener.

15. The universal hardware nut of claim 13, wherein the nut body is manufactured from rubber, fiber-reinforced rubber, synthetic rubber, silicone, flexible or soft plastics, wood, leather, composite materials, or combinations thereof.

16. The universal hardware nut of claim 13, wherein the nut body comprises a thickness which correlates to a predetermined strength of a fastener assembly which comprises the nut body.

17. The universal hardware nut of claim 13, wherein the first face and second face of the nut body are circular, elliptical, rectangular, triangular, or polygonal in shape.

18. The universal hardware nut of claim 13, wherein a diameter of the sized hole corresponds to a standardized fastener.

19. The universal hardware nut of claim 13, wherein the one or more slots comprise two slots oriented in a perpendicular cross configuration.

* * * * *

UNITED STATES PATENT AND TRADEMARK OFFICE
CERTIFICATE OF CORRECTION

| | | |
|---|---|---|
| PATENT NO. | : 12,085,106 B2 | Page 1 of 1 |
| APPLICATION NO. | : 17/677836 | |
| DATED | : September 10, 2024 | |
| INVENTOR(S) | : William Noah Dearing | |

It is certified that error appears in the above-identified patent and that said Letters Patent is hereby corrected as shown below:

In the Claims

Claim 4 it says "strength of thea fastener" where as it should be "strength of the fastener".

Claim 7 it says "of different types; or thread pitches;" where as it should be "of different types or thread pitches".

Signed and Sealed this
Third Day of December, 2024

*Katherine Kelly Vidal*

Katherine Kelly Vidal
*Director of the United States Patent and Trademark Office*